No. 629,031. Patented July 18, 1899.
A. GUASCO.
STERILIZING SPITTOON.
(Application filed Sept. 27, 1898.)
(No Model.)

Witnesses.

Inventor.
André Guasco,
By H. A. de Vos.
Attorney

UNITED STATES PATENT OFFICE.

ANDRÉ GUASCO, OF PARIS, FRANCE.

STERILIZING-SPITTOON.

SPECIFICATION forming part of Letters Patent No. 629,031, dated July 18, 1899.

Application filed September 27, 1898. Serial No. 691,972. (No model.)

*To all whom it may concern:*

Be it known that I, ANDRÉ GUASCO, a citizen of the French Republic, residing in Paris, Department of the Seine, France, have invented a new and useful Sterilizing-Spittoon, of which the following is a specification.

My invention relates to improvements in spittoons; and its object is to provide a sterilizing-spittoon for hospitals and the sick-room, especially for such places where consumptive persons are treated, but which of course commends itself just as well for general use. Its characteristic features consist in the combination of a receptacle destined to receive the expectorations, with an arrangement permitting to produce in a continuous manner a certain quantity of formic-aldehyde gas sufficient to constantly keep the liquid in the receptacle, however much it may be varied in quantity by the successive additions of expectorations, in a thoroughly saturated and sterilized state. This arrangement consists of a bell-shaped vessel, in the lower portion of which the liquid to be sterilized penetrates, and it contains a cake of porous material able to hold a considerable quantity of condensed formic aldehyde or trioxymethylene.

Figure 1:
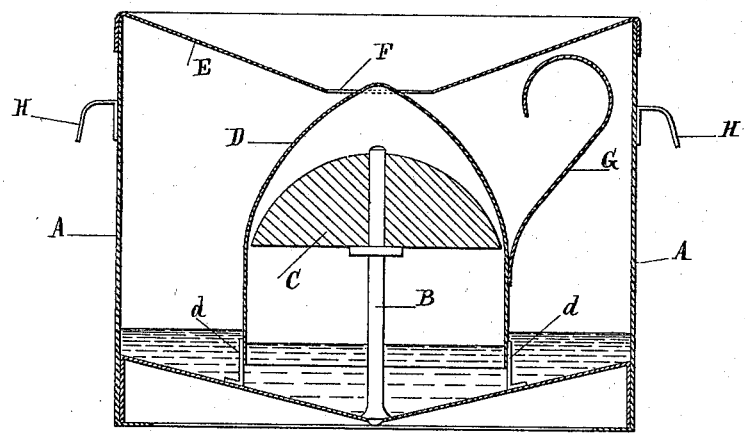
Figure 2:
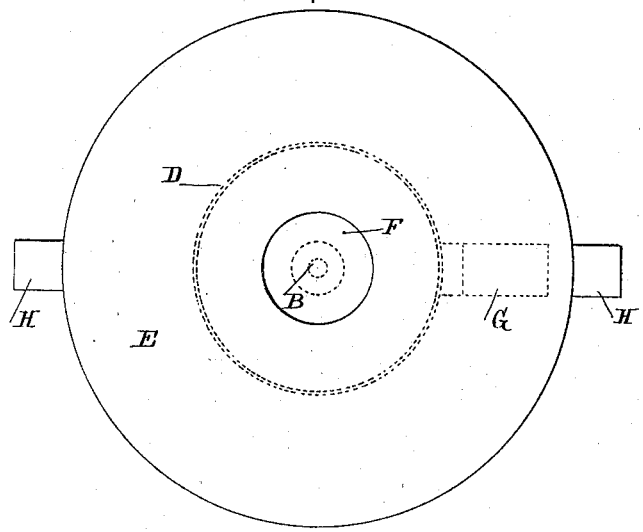

In the accompanying drawings, Figure 1 is a vertical cross-section of my invention shown in an elevation, and Fig. 2 is a plan view.

Similar letters refer to similar parts throughout.

The spittoon in question may be made of any suitable material, and it may be given any desired shape. In the development shown in the drawings it is cylindrical.

A is the receptacle receiving the expectorations. Its bottom has a conical form, so that the liquid deposited in the receptacle is deeper in the center of the latter than it is near its wall. Fastened to the bottom of the receptacle and in the center of the same is a vertical post B, which supports the porous cake C, made of any suitable material—such as for instance, plaster, argil, terra-cotta, &c.—which cake is destined to hold a sufficient quantity of condensed formic aldehyde or trioxymethylene or other suitable disinfecting substances.

The bell-shaped vessel D covers the cake C and rests on standards d, which must be arranged in such a manner that they do not prevent the liquid contained in the receptacle from penetrating into the lower portion of the vessel D. Of the said liquid there need not be more in the receptacle than is required to constitute a hydraulic joint or closure of the vessel D. The receptacle A is covered by a conical lid E, having in its center an opening F for the reception of the expectorations. The bell-shaped vessel D is provided with a handle G, and the receptacle A has two handles H.

The working of the apparatus is as follows: The cake C imprisoned in the vessel D develops sufficient formic-aldehyde gas to thoroughly saturate and sterilize the liquid contained in the receptacle A, while the same liquid prevents the gas from escaping from the receptacle and entering the sick-room, where it would become disagreeable to the sick as well as to the persons attending to the same. This liquid sterilizes the expectorations falling therein and in the measure. As the liquid increases by the addition thereof, the production of gas is also increased in the vessel D, so that the gas production will always be proportionate to the quantity of liquid contained in the receptacle, whereby a thorough saturation and sterilization of the expectorations is assured.

For the cleaning of the spittoon the lid or cover E is to be lifted off and the vessel D and the sterilizing-cake C taken out, whereupon the receptacle may be cleaned and then the whole put together as before.

This new spittoon has the advantage of being very economical, for the antiseptic materials are only used up in a reasonable and proportionate measure, and, furthermore, it exhales no disagreeable vapors and can be easily handled and without danger by any person at hand.

Having thus fully described my invention and the way it has to be handled, what I claim, and desire to secure by Letters Patent, is—

1. In a sterilizing-spittoon, the combination with an outer casing or receptacle A, of a bell-shaped inverted vessel D, a porous cake C saturated with a suitable volatile disinfectant, supported in the inverted vessel D, a lid E, and standards d, for supporting the inverted vessel D, substantially as shown and described.

2. In a sterilizing-spittoon, the combination with an outer casing or receptacle A, of a bell-shaped inverted vessel D having a conical closed end supported in the receptacle A, so as to leave an enlarged annular space between the wall of the receptacle and that of such vessel, a downwardly-concaved removable top E having a central orifice F for the reception of the expectorations located on top of the receptacle A, a cake of porous material C, adapted to be saturated with a suitable volatilizing disinfecting substance, supported within the vessel D, and a body of liquid adapted to absorb the volatile gas of the disinfectant located in the bottom of the receptacle A, and forming a liquid seal for the vessel D, substantially as shown and described.

In witness whereof I have hereunto set my hand in presence of two witnesses.

ANDRÉ GUASCO.

Witnesses:
EDWARD P. MACLEAN,
J. VICTOR MATRAY.